Fig.1

Inventors:
Karl Ackermann
Siegfried Schöne
Wilhelm Nimz
By: Spencer & Kaye
Attorneys

July 11, 1967  K. ACKERMANN ETAL  3,330,059
PROJECTOR

Filed Aug. 30, 1965  7 Sheets-Sheet 6

Inventors:
Karl Ackermann
Siegfried Schöne
Wilhelm Nimz

By: Spencer & Kaye
Attorneys

United States Patent Office 3,330,059
Patented July 11, 1967

3,330,059
PROJECTOR
Karl Ackermann, Siegfried Schone, and Wilhelm Nimz, Berlin, Germany, assignors to Robert Bosch Elektronik GmbH, Berlin-Wilmersdorf, Germany
Filed Aug. 30, 1965, Ser. No. 483,478
Claims priority, application Germany, Mar. 23, 1965, B 81,117
15 Claims. (Cl. 40—79)

ABSTRACT OF THE DISCLOSURE

A photographic slide projector in which the slide changer carriage is reciprocally movable parallel to the optical axis of the projector between a dispensing position and a projecting position. A lever is coupled to the slide changer carriage and engages a cam path therein for moving a slide out of a slide magazine and into the picture aperture of the projector when the slide changer carriage is moved from its dispensing position to its projecting position, and for moving the slide back into the slide magazine when the slide changer carriage is moved from its projecting position to its dispensing position.

---

The present invention relates to a slide projector having a slide changing device which transports an individual slide from a laterally provided slide magazine tray into the picture aperture of the projector and back into the magazine, whereby the magazine is then stepwise displaced in a direction parallel to the optical axis of the projector. More particularly, the present invention relates to a slide projector wherein the slide changer has a manual or remote controlled member which controls a pivotable lever effecting the conveyance of the slide and also controls the stepwise shifting of the magazine.

Slide changers performing the above functions are known in various forms. In a number of these slide projectors, the slide changing devices must be actuated by the projectionist laterally pulling out a control knob a certain distance from the housing and then pushing it back in again, this distance corresponding to the path of the slide from the dispenser to the picture aperture. Thus, sufficient space must be left on the table at the side of the projector carrying the control knob for performing this action.

In other known slide projectors, the slide changing device is to be operated by turning a crank or a larger knob with transmission gearings of cogwheels and cog racks transforming the rotational movement produced by the crank or the knob into a lateral motion of the slide changing device. Similar transmission gearings are required by known slide projectors wherein the projectionist must pull out a vertically movable plunger and then push it in again. These transmission gearings, however, are expensive to manufacture and susceptible to breakdown, and furthermore, the operation of the slide changing device is cumbersome.

Another type of projector includes a slide changer wherein the lever effecting the transport of the slide is driven by a control lever preferably pivotal in a horizontal plane via an elastic coupling. This lever is provided with a handle laterally projecting from the housing of the device whereby this lever almost contacts the housing wall only in the two final positions, but juts out from the housing in a cumbersome way in the middle of its pivotal movement. Furthermore, the stepwise shifting of the dispenser can be done in only one direction, and a Bowden wire is used for remotely controlling this slide changer since it is difficult to provide a motor therefor.

It is an object of the present invention to provide a slide changer which is easy to operate.

Another object of the invention is to provide a slide changer which controls the displacement of slide dispenser in stepped manner in two directions.

The present invention provides a sliding carriage as the movable control member, the carriage being longitudinally movable in the direction of the optical axis of the projector. The sliding carriage has a cam path for the positive guidance of a pivotable lever and is also provided with a connecting rod pivotably connected thereto. With each forward and backward motion of the slide carriage the connecting rod having a cam follower being guided in a track, causes an angular rotation of a disk coupled to the slide magazine via a pin wheel or cogwheel thereby shifting the magazine.

Although, as previously mentioned a slide projector having a sliding carriage as a movable control member is known, the slide magazine or the dispenser of that projector is provided beneath the picture aperture and a belt-crank lever connected with the carriage lifts the slide into the picture aperture and lowers it again therefrom. This known slide carriage thus moves transverse to the direction of the optical axis of the projector, and the slide changing device is driven by a motor.

Since the slide changer is motorized, there is no provision in the projection for a manual operation as is sometimes desired or required. Furthermore, the dispenser can be moved only in one direction, in a stepwise manner.

It is therefore another object of the present invention to provide a slide changer for a projector which may be controlled manually or by remote means for motorized operation. According to a feature of this invention, the sliding carriage is rigidly connected to a handle which projects upwardly from the projector housing for manual operation of the changer. Since the handle is upwardly projecting, it maintains its relatively small distance from the housing wall during the entire forward and backward movement of the carriage.

A further object is to provide a slide changer which causes minimal wear to the frame of the slide.

According to another feature of the invention, a guide rail is provided in the region of the picture aperture for receiving the lower edge of the slide, the guide rail being movable in a vertical plane, for example pivotable about a shaft, and being pulled upwardly by means of a spring. A second curved cam path guide is provided at the carriage which engages a cam follower connected with the lower guide rail, in such a manner that the second cam guide perforce lowers the lower guide rail during the first section of the conveyance of the slide from the dispenser into the picture aperture, against the force of a spring, and then again frees the lower guide rail.

In this manner, the slide enters the projection position without its large surfaces being touched by any structural components, such as check springs which are stationary and press against the frame of the slide causing the frame to be worn off. In a slide projector according to the present invention, only the lower horizontal edge of the slide frame is worn because of friction at the V-shaped surface of the lower guide rail, and even this occurs only during the last stage of transporting the slide from the dispenser into the picture aperture, i.e. when the lower guide rail is released by the second cam path and pulled upwardly by the spring.

Another feature of the invention includes the provision of a disk coupled with a pin wheel or cogwheel for displacing the dispenser. The disk can be fixedly connected with the wheel in a coaxial manner and can be provided at its outer circumference with a number of recesses corresponding, for example, to the number of pins or teeth of the wheel. Furthermore, a follower means attached to a connecting rod can engage, with each backward movement of the sliding carriage, respectively one recess of the disk and thereby turn the disk through an angle corresponding to one switching step of the dispenser.

The disk can be mounted in a guide plate enclosing the circumference of the disk, and an extension of the guide plate being provided with a switch for controlling the direction of rotation of the disk and thus the direction of shifting the dispenser.

The present invention also includes a remotely controlled embodiment, wherein a guide element is rigidly connected with the sliding carriage upon which an engaging device, eccentrically rotating and driven by a motor effects the movement of the carriage from the dispensing position to the projection position and back upon each rotation.

Additional objects and advantages of the present invention will become apparent upon consideration of the following description when taken in conjunction with the accompanying drawings in which.

Figure 1:
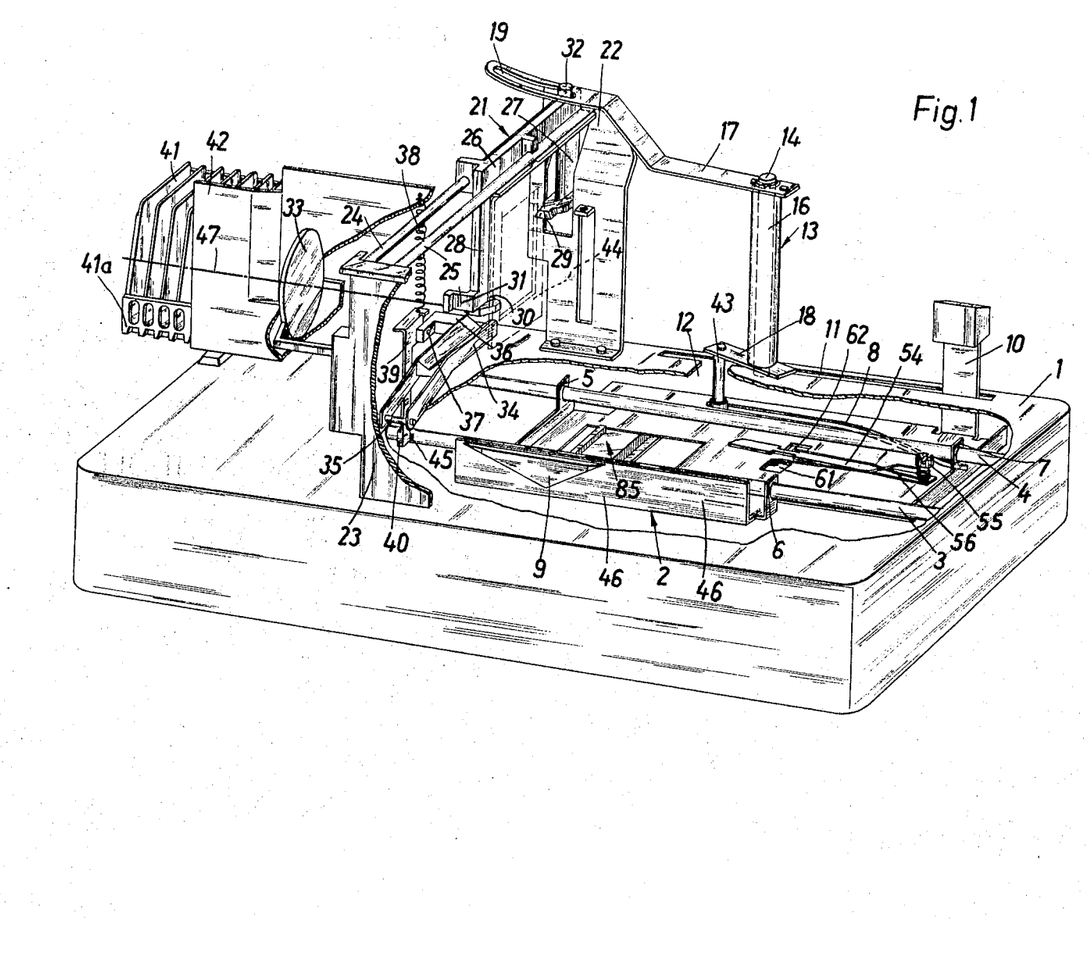
FIG. 1 is a perspective view of the slide changing device according to the present invention including a pivotable lever provided above a chassis, a picture transporting means, and a sliding carriage provided beneath the chassis.

Referring now to the drawings, there is shown in FIG. 1 a slide projector having a rectangular chassis 1, with two rods 3 and 4 mounted close to its lower surface, the conventional projection system not being shown. An approximately rectangular reciprocatory carriage 2 is mounted by three upwardly bent flanges 5, 6 and 7 to the two rods, for longitudinal displacement across almost the entire length of the chassis, the displacement being controlled in manual operation by a handle 10 projecting upwardly through a long slot 11 in the chassis.

In the large surface of the sliding actuator carriage 2, a curved guide or cam path 8 is provided formed by an elongated and somewhat curved slot, a cam follower roller 43 engaging this path with its lower end.

A pivotable lever 13 is rotatably mounted about a supporting pin 14 of circular cross section fixedly mounted to the chassis 1. The pivot lever comprises a tube 16, a longer lever arm 17, and a shorter lever arm 18 which may be assembled by riveting the tube together with the two lever arms. A curved slot 19 is provided at the free end of the longer lever arm 17, while the previously mentioned follower pin 43 is fastened to the free end of the lower shorter lever arm and extends through a broad, short slot 12 in the chassis 1 to the cam path 8.

Two supporting frames, a rear frame 22 and a front frame 23, are mounted to the chassis with two rods, 24 and 25, being mounted therebetween with their tapering ends inserted into corresponding bores of the two frames. A bracket-like slide transporter 21 is suspended on these two horizontal rods which are parallel to each other, and is guided by the rods. From the center portion 26 of this transporter 21, there are suspended a rear side strut 27 having a plunger 29 facing to the front, and a front side strut 28 with a rearwardly facing plunger 30. The picture transporter 21 is further provided with an upwardly pointing pin 32 fitting into the curved slot 19.

The position of a slide 44 to be removed from a dispenser 41 is indicated by dashed lines and is located in the region of the plungers 29, 30.

Figure 3:
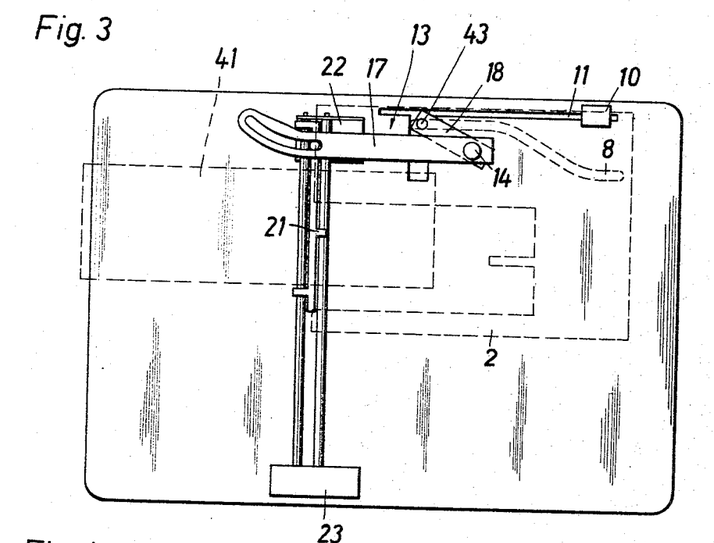
FIG. 3 is a top view of the schematically shown slide changing device in the dispensing position.
Figure 5:
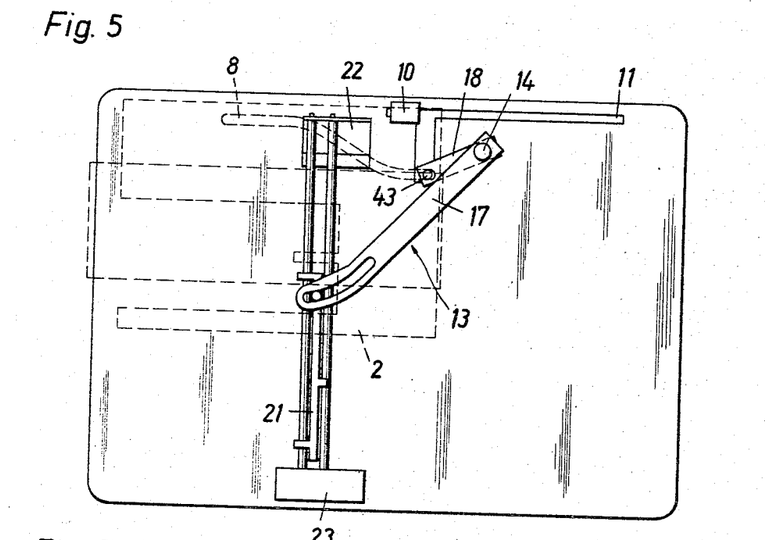
FIG. 5 is a top view of the device similar to FIG. 3 showing the device in the projection position.
Figure 7:
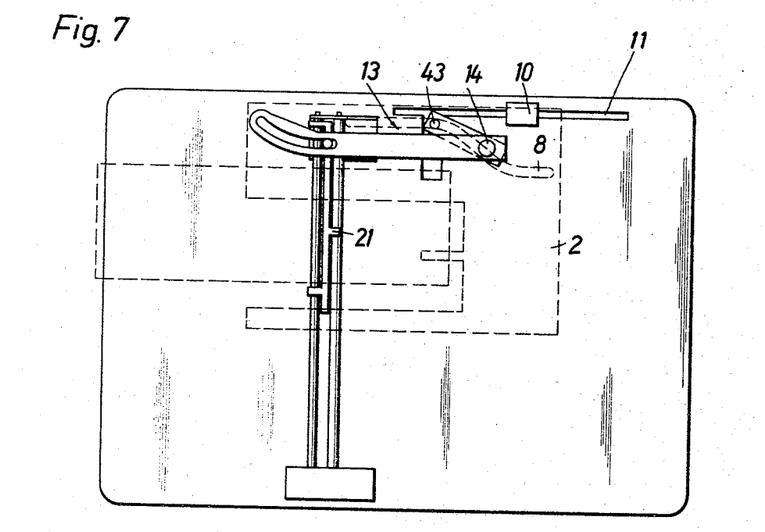
FIG. 7 is a top view of the device similar to FIG. 3 with the carriage shown half-way in its movement.

FIGS. 3, 5 and 7 show the effect of the sliding carriage 2 upon the slide transporter 21, that is, by displacing the sliding carriage from the right-hand ending position illustrated in FIG. 3, which represents the dispensing position through the halfway position illustrated in FIG. 7 and into the left-hand ending position of FIG. 5, which represents the projection position, the cam follower 43 positively guided in the slot-shaped curved cam path 8 is pressed to the front, i.e. toward the center of the chassis and during this movement pivots the shorter lever arm 18, as well as the longer arm 17 in a counter-clockwise manner. Thereby, the slide transporter 21 is moved to the front into the projection position, and the plunger 29 of the picture transporter pushes the slide 44 along to the front projection position.

A shaft 35 is fixedly mounted to the frame 23 about which a guide rail 34 for receiving the lower edge of the slide 44 is pivotable. A horizontally extending pin 37 is provided at an angle section 36 fixedly connected with the rail 34 and a lever 39 having its lower portion downwardly extending through the chassis 1 is rotatable about the pin 37. The lever is pulled upwardly by a helical spring 38 suspended with its upper end on an intermediate wall 42 of the chassis 1 until a projection 40 at the lower end of the lever touches the underside of the chassis with its upper shoulder.

Figure 2:
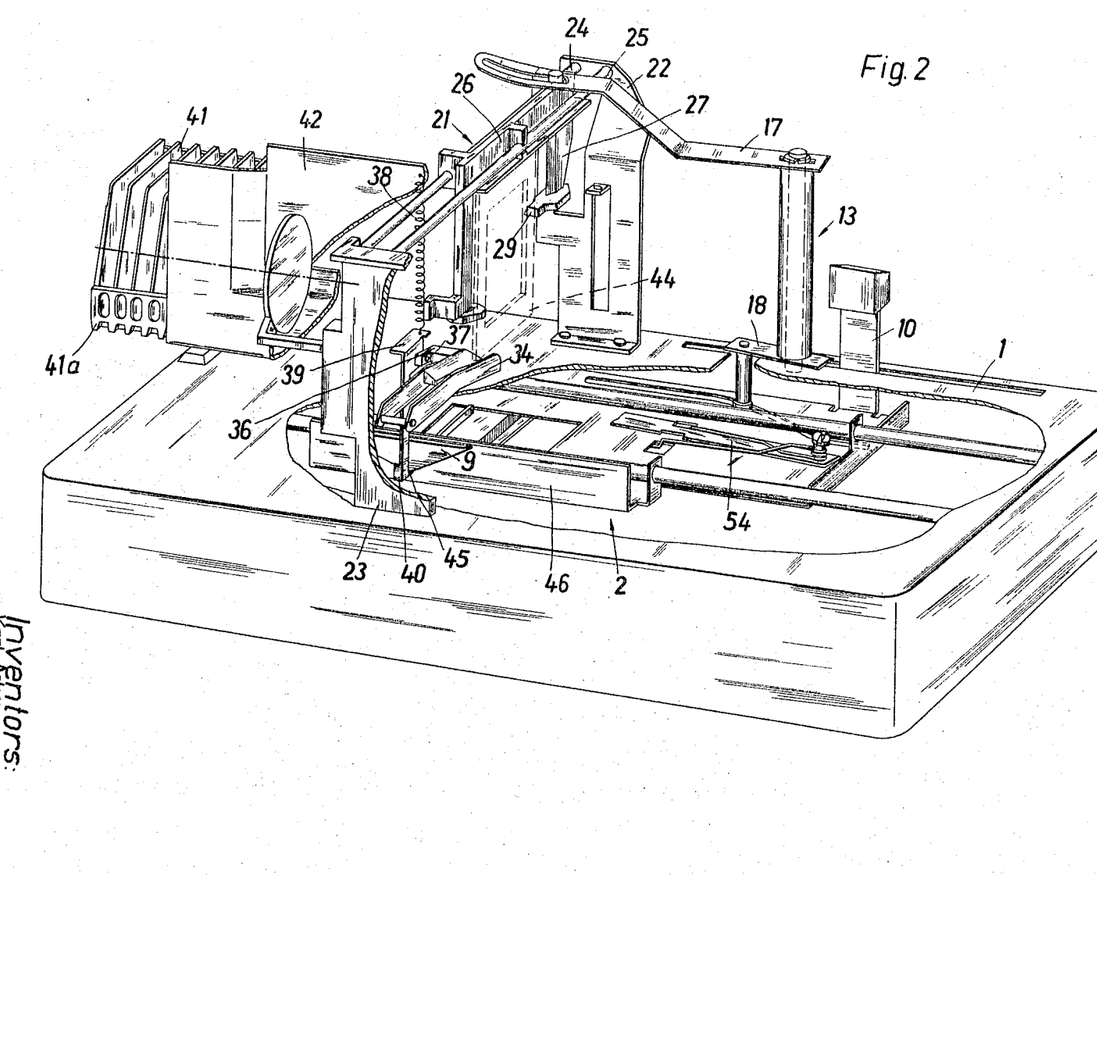
FIG. 2 is a perspective view of the device similar to FIG. 1 showing the sliding carriage half-way during its movement.

As shown in FIG. 2, a hook 45 functioning as a cam follower is provided at the lower end of the lever 39 and engages a second curved cam guide 9 of the actuator carriage 2. The second cam guide, for example, comprises a triangular structure of flat material riveted to the outer surface of the side wall 46 of the slide carriage 2, whereby the engagement takes place when the slide carriage is displaced to the left. Thereby, the lever 39 is continuously lowered against the force of spring 38, until it reaches its lowest position illustrated in FIG. 2.

Together with the lever, the angle section 36 via the pin 37 and thus the guide rail 34 are lowered so that, as shown in FIG. 2, the slide 44 has its front edge placed upon the guide rail at the time the first stage of transporting the slide from magazine 41 into the picture aperture takes place. During the further course of this transport motion, the guide rail is again gradually raised by the follower 45 sliding upwardly along the lower edge of the right incline of the cam guide 9.

This guide rail thus presses the slide 44 upwardly against the lower surface of the central portion 26 of the bracket-shaped slide transporter 21, this surface of portion 26 forming a V-shaped mounting, similar to that of the guide rail 34. Simultaneously, the plunger 29 of the rear side strut 27 of the picture transporter 21 continues to push the slide upon the guide rail. During this transporting process, only the lower horizontal edge of the slide frame is worn and then only to a minor degree because of their frictional engagement with the V-shaped inclined surfaces of the guide rail.

A shutter mask 33, shown in FIG. 1, for occulting the light beam path of a projector lamp during the picture change, is pivoted out of the projection axis 47 by means of an arm 31 fastened to the front side strut 28, a short time before the picture transporter 21 reaches the projecting position.

Figure 4:
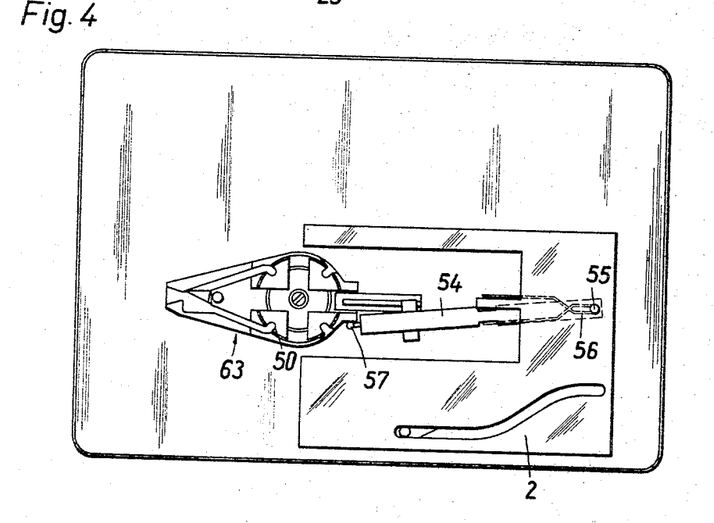
FIG. 4 is a bottom view of a rotatable disk for displacing the dispenser mounted to the bottom of the chassis and wherein the carriage is shown in the dispensing position.
Figure 10:
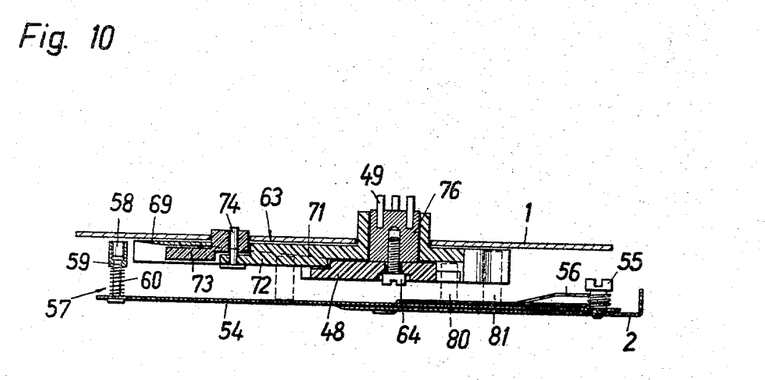
FIG. 10 is a partially schematic view of a section along the plane X—X of FIG. 9 and through a connecting rod of the sliding carriage.

As shown in FIGS. 1, 4 and 10, a screw 55 is provided in a threaded bore of the slide carriage and has a deflectible connecting rod 54 mounted on the smooth shaft thereof. The rod may, for example, be formed from a flatt strip of sheet metal. This rod is maintained in a central position corresponding to the direction of movement of the slide carriage or is automatically returned into this position by two legs of an elongated double spring 56 whose windings are also positioned around the shaft of the screw.

If, for example, the connecting rod 54 is deflected to the rear, under an influence which will be explained below, the front leg of the elongated double spring 56 is supported on the rear edge of a cutout 61 of the slide carriage 2, while the rear leg of the spring tries to move the connecting rod 54 back into its central position. Conversely, when there is a deflection to the front, the rear leg of the spring rests on the front edge of a cutout 62 of the slide carriage.

As shown in FIG. 10, a variable length pin 57 serving as a cam follower is mounted at the left end of the connecting rod 54, the follower comprises a small tube 58 open at its top but being narrowed at its lower end, a helical spring 60 and a bolt 59 riveted onto the connecting rod. The small tube is slidably mounted on the bolt and slides thereon against the force of the spring and thus the length of the follower adapts to the respective contact surface opposite the face of the follower.

Figure 9:
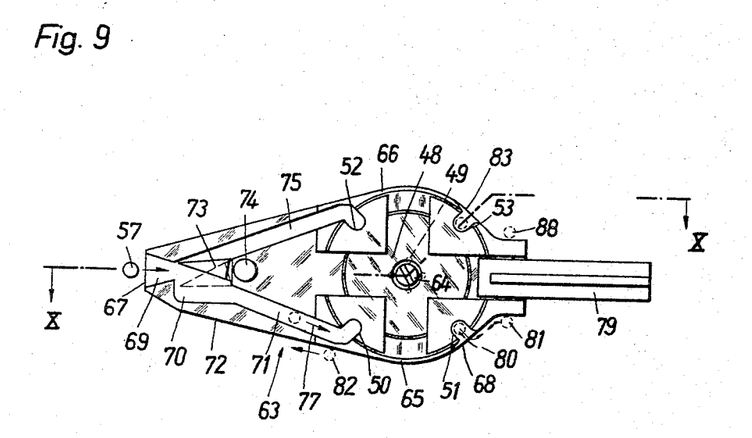
FIG. 9 is a view of a rotatable disk in a guide plate, mounted to the underside of the chassis.

As shown in FIGS. 9, 10, a cam plate 63 is mounted to the underside of the chassis 1 by a suitable means such as screws. The cam plate is provided with a right-hand rounded portion and an extension 72 pointing to the left and being formed with an acute angle. The cam plate may be extruded or molded, for example, from plastic.

In the right-hand rounded portion of the plate 63, a round disk 48 is mounted by having its circumference with its larger portion surrounded by the cam plate and having a certain amount of play therebetween. On the upper side of the disk, a pin wheel 76 with four pins 49 inserted on the upper front surface of this wheel is coaxially mounted by means of a screw 64, as shown in FIGS. 9 and 10. The pins engage a toothed rack 41a provided at the lower side portion of the magazine 41 indicated in FIG. 1 and displaces the magazine by one step when the pin wheel is rotated through a right angle. Although the rack is shown as a portion of the magazine, it may be provided separately as a part of a carrying rack for the magazine.

Below the stationary guide plate 63, the slide carriage 2 is moved, if desired, from the right-hand position shown in FIGS. 1 and 4 which represents the dispensing position, into the left-hand position shown in FIG. 6, which represents the projection position with the motion being in the forward direction. Subsequently, the carriage is moved in the rearward direction, opposite to the first movement from the left to the right. During this process, the follower 57 of FIG. 10 and thus also the connecting rod 54 are guided, during the forward motion of the slide carriage, on another track than when the carriage is moved backward.

Figure 6:
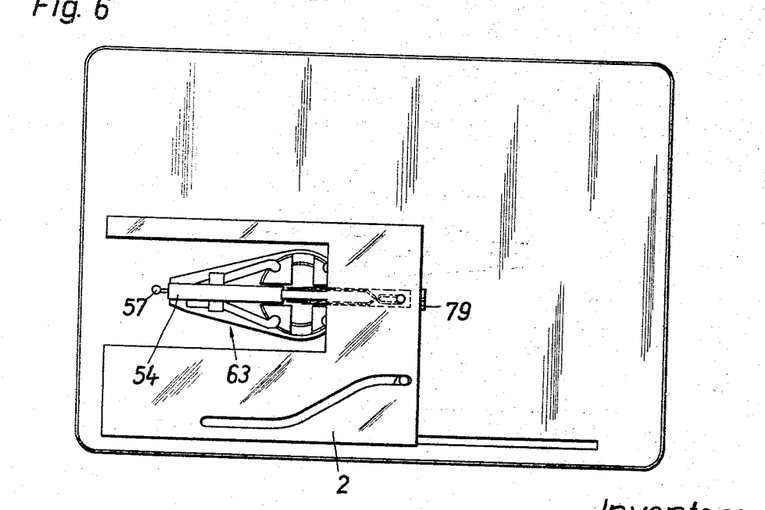
FIG. 6 is a bottom of the disk similar to FIG. 4 showing the changing device in the projection position.

Starting from the dispensing position of the slide carriage 2 of FIG. 4, wherein the pin of variable length 57 serving as the follower means resiliently contacts the outer surface of the cam plate 63 under the influence of the elongated double spring 56 and can extend to its full length, the follower is resiliently guided on this outer surface during the entire forward motion of the slide carriage, until it loses contact with the guide plate when reaching the projection position shown in FIG. 6 or 10, with the connecting rod 54 then assuming its central position shown in FIG. 6.

As mentioned above, the round disk 48 is mounted in the right-hand rounded portion of the guide plate 63 by having its circumference surrounded by wall sections of the plate. As shown in FIGS. 9 and 10, the disk is encircled by a countersunk portion of the plate extending to about half the thickness of the plate and is surrounded, for example, by partial walls 65, 66 which continue up to the left end of the plate and there leave an opening 67 for receiving the cam follower means 57.

If, now, the slide carriage 2 is moved, from the projection position shown in FIG. 6, backward to the right, the cam follower 57 contacts through the opening 67 an obliquely extending path 69 of a guide track as shown in FIGS. 9 and 10, this track being continued in a horizontally extending path 70 and an obliquely extending path 71. The small tube 58 of the follower always resiliently contacts the opposite contact surface of the guide track, thus shortening the length of the follower. In any event, the follower 57 is guided, during the further backward movement of the slide carriage in the direction of arrow 77 and arrives in one of four recesses 50, 51, 52, 53, provided at the outer circumference of the round disk 48, namely the recess 50, as shown.

Figure 8:
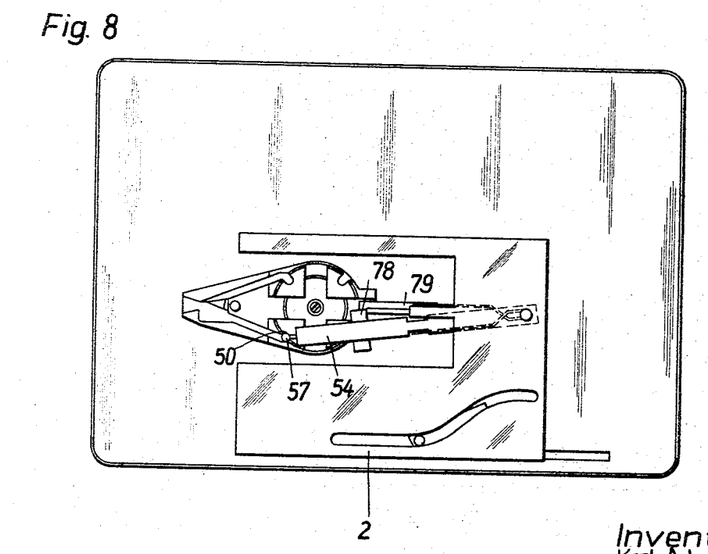
FIG. 8 is a bottom view of the disk similar to FIG. 4, with the carriage shown half-way in its movement.

In the position of the follower 57 indicated in FIG. 8, the connecting rod 54 has pushed a locking slide 79 to the right by means of a widened portion 78 provided thereon. The slide prevoiusly engaged with its left end one of the four grooves provided at the large free surface of the round disk 48, under the force of a spring, not shown, and thus blocked the disk against further rotation, as shown in FIG. 9.

The follower 57 which has reached the recess 50 of disk 48 during the backward movement of the slide carriage 2 thus can take the disk along and displace it through a right angle in counterclockwise direction until the cam has reached the position indicated in FIGS. 9 and 10 by a circle or rectangle 80 shown in dashed lines. The pin wheel 76 is also correspondingly rotated, and the pins 49 displace the dispenser 41 by one step.

The locking slide 79 in the meantime had disengaged the enlarged portion 78 of rod 54 at the greatest deflection of the connecting rod 54 and again locked the disk 48. The follower 57 must thereby leave the recess 50 upon further backward movement of the slide carriage 2, this recess having been rotated, with respect to FIG. 9, through a right angle in the counterclockwise direction, via an opening 68 provided at the right end of the wall section 65 for the cam to pass through, and finally assumes the position, in the right hand position of the slide carriage, shown in FIG. 4, corresponding to the position illustrated in FIGS. 9 and 10 with a circle and a rectangle 81, respectively, in dashed lines.

The guide track is approximately half the thickness of the cam plate 63, and extends from the opening 67 for the passage of the follower 57 at the left end of the cam plate to the opening 68 for the exit near the right end of the plate. The follower comprising the variable length pin extends to its full length at the moment of sliding down at the opening 68 and thus cannot insert itself into the exit opening 68 upon a renewed forward movement of the slide carriage to the left, because this opening 68 does not extend down to the underside of the chassis 1. Rather, the cam is resiliently guided along the outer surface of the plate 63 upon this renewed forward movement of the slide carriage, as described above, and during this motion arrives, via the position indicated by a circle 82 shown in dashed lines in FIGURE 9, at the right end of the cam plate.

Instead of fashioning the cam follower 57 as a pin of variable length, it is possible to make the connecting rod in the shape of a leaf spring carrying a pin of constant length serving as the follower, and to resiliently press this pin against the respective contact surface.

In order to displace the dispenser 41 in a stepwise manner in a direction opposite to that described previously, i.e., to be able to rotate the round disk 48 in a clockwise manner, a switch 73 is provided, as shown in FIGURE 9, on the horizontally extending path 70 of the guide track, this switch thereby guides the cam follower 57 selectively onto the above-mentioned path 71 of the guide track or onto a path 75.

The switch 73 has a left-hand portion which is tongue-shaped and is rotatable about a pin 74 fixedly anchored in the guide plate 63. The switch can thus be pivoted into the position indicated in FIG. 9 by means of a triangle in dashed lines, from the outside by means of an extension passing through the chassis 1. If, for this position of the switch, the slide carriage 2 and thus the cam follower 57 are moved to the right, the follower makes a left turn after passing through the opening 67 for its entrance and subsequently enters the obliquely extending path 69. The follower then arrives via the path 75 of this guide track, into the recess 52, rotates the disk in clockwise direction through a right angle, and exits from the guide plate 63 via the opening 83. The follower in this case remains in the position shown by a circle 88 in dashed lines, as soon as the slide carriage has reached its right-hand position.

Figure 11:
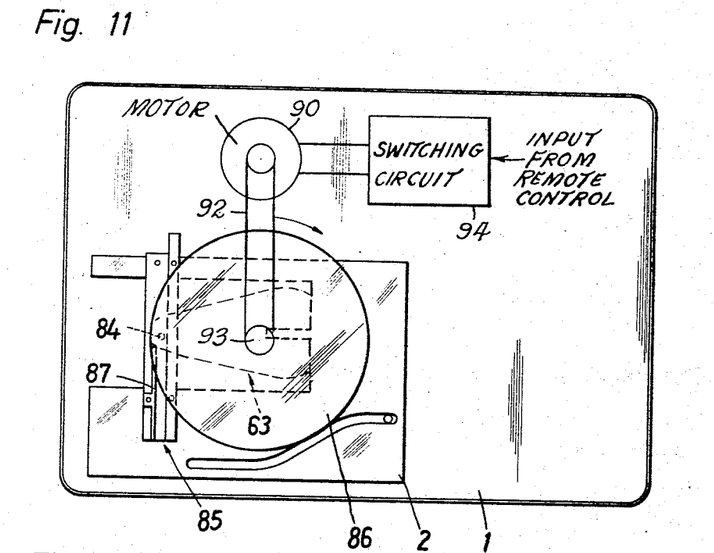
FIG. 11 is a schematic view from the bottom of the sliding carriage in the projection position, having a groove-like guide element for a motor drive.
Figure 12:
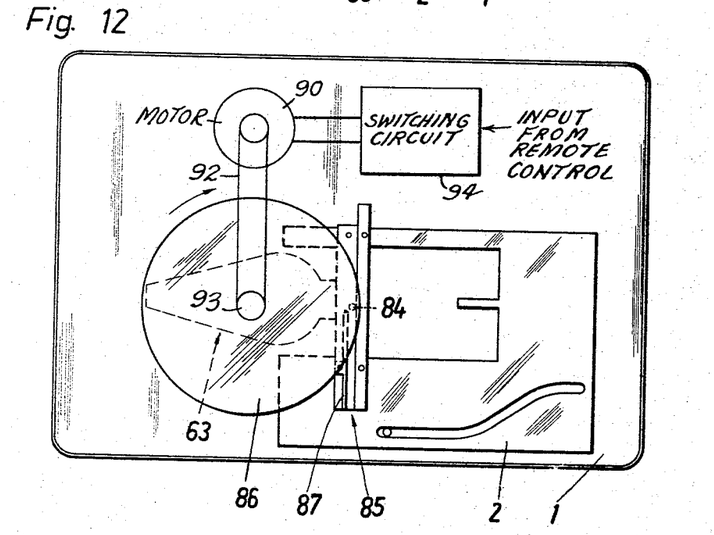
FIG. 12 is a schematic view similar to FIG. 11 with the sliding carriage being shown in the dispensing position.

As shown in FIGS. 11 and 12, a guide element 85 for the actuator carriage having a straight-line guide groove is mounted to the underside of the carriage 2. The left flange 87 of this guide groove is provided with an opening extending from about the center of the groove up to its upper end. A pin-like engaging means 84 for effecting movement of the guide groove is eccentrically mounted on a plate 86 which is driven by a motor 90 via a drive belt 92, which is coupled to the drive shaft 93 of plate 86. The opening in the flange 85 permits the entrance and exiting of the engaging means 84 whereby the engaging means moves from the right flange to the left flange and back again.

If the slide carriage 2 is in the projection position of the slide projector shown in FIG. 11, and if the next slide is to be introduced manually, it is possible without difficulty to move the slide carriage by means of the handle 10 to the right into the dispensing position, and subsequently to the left, without the movement being inhibited in any way by the engaging means 84, since engaging means 84 does not prevent movement of the slide carriage to the right in FIGURE 11.

In contradistinction thereto, if a remotely controlled change of a slide is desired, a full rotation of the plate 86 in the direction of the arrow is initiated by a conventional switching circuit 94 which is coupled to motor 90. In the first half of the rotation of the plate, the pin-like engaging means 84 pushes against the right flange of the guide groove 85, thereby moving the slide carriage 2 into the dispensing position shown in FIG. 12. In the second half of the rotation following automatically, the engaging means changes to the left flange 87 of the guide groove and moves the slide carriage to the left back to the position shown in FIGURE 11. From the position of the carriage shown in FIG. 11, the projectionist again can introduce the next slide either by hand or by remote control.

Once the last slide of the dispenser 41 has been shown and a new dispenser is to be inserted, the projectionist manually moves the slide carriage 2 from the right into the dispensing position of FIG. 12, changes the dispenser, and then can selectively conduct the picture change either manually, as before, or by actuating the switch of the remote control means whereby the slide carriage is transported to the left by means of the motor, the plate 86, and the engaging means 84, with the motor idling during the first half of the rotation of the plate.

Thus, through the use of a guide groove as a guide element, the projector may be operated manually or by remote control of a motor. Accordingly, it is of no consequence whether the motor has already been permanently built into the device during the assembly of the slide projector or whether at first only the guide groove is provided at the sliding carriage and the motor and gripping means are to be inserted subsequently. The subsequent insertion of the motor offers the possibility, which may be convenient in certain cases, to purchase a remote-controllable slide projector in two stages, i.e., the subsequent conversion to a motorized operation.

It is also noted that the provision of a lowerable guide rail as described may be used to advantage in slide projectors other than the type of projector of the present invention.

It will be understood that the above description of the present invention is susceptible to various modifications, changes, and adaptations, and the same are intended to be comprehended within the meaning and range of equivalents of the appended claims.

What is claimed is:

1. In a slide projector having a chassis, a projection system and a picture aperture in the optical axis of the projection system, a slide changing device for transporting a slide from a slide magazine which is parallel to the optical axis into the picture aperture and back into the magazine, and then stepwise displacing the magazine in a direction parallel to the optical axis, said slide changing device comprising, in combination:
    (a) an actuator carriage mounted on the chassis for reciprocatory movement in the direction of the optical axis between a dispensing position and a projecting position;
    (b) slide transport means provided in the region of the picture aperture for conveying a slide from the magazine to the picture aperture and back to the magazine;
    (c) lever means coupled to said slide transport means for actuating said slide transport, said carriage being provided with a first cam path means for positively receiving a follower portion of said lever means to cause the same, during travel of said carriage from the dispensing position to the projecting position, to actuate said slide transport means for conveying a slide from the magazine to the picture aperture and, during travel of said carriage back to the dispensing position, to actuate said slide transport means for conveying a slide in the picture aperture back to the magazine;
    (d) moving means mounted in said chassis for displacing the magazine in said direction parallel to the optical axis; and
    (e) connecting means interposed between said carriage and said moving means for effecting a predetermined movement of said moving means, once upon each travel of said carriage from the dispensing position to the projecting position and back again, for displacing the magazine, in the direction of the optical axis, a distance which results in a view slide held in the magazine to be aligned with the picture aperture.

2. A device as defined in claim 1, wherein said moving means comprises:
    (a) wheel means having extensions thereon upwardly extending through the chassis for engagement with a rack means for displacing the magazine in a stepped manner, said wheel means being a pinwheel or a cogwheel; and
    (b) rotatable disk means coupled to said wheel means for actuating the same, said connecting means having a follower portion thereon for engaging and rotating said disk means through a predetermined angle of rotation.

3. A device as defined in claim 2 wherein said lever comprises:
   (a) a vertical supporting pin provided laterally of the magazine about which said lever pivots;
   (b) a first lever arm mounted at one end of said pin, said first lever arm being provided with a slot for receiving a pin portion of said slide transport means, whereby said lever is coupled to said slide transport means for actuating the same;
   (c) a second lever arm mounted at the other end of said pin, said second lever arm being shorter than said first lever arm having said follower portion of said lever connected thereto, whereby said second lever is pivoted in accordance with the movement of said follower in said first cam path.

4. A device as defined in claim 3 wherein said slot in said first lever arm is curved.

5. A slide projector as defined in claim 4 and further comprising two horizontal rods arranged parallel to each other in the region of the picture aperture and transverse to the optical axis of the projector, said rods having said slide transport means suspended therefrom for guiding said transport means along the extent thereof during the conveyance of a slide.

6. A device as defined in claim 2 and further comprising manually operable handle means for moving said carriage, said handle means being rigidly connected to said carriage and upwardly projecting through the projector chassis.

7. A device as defined in claim 2 and further comprising:
   (a) guide rail means mounted for pivotal movement in a vertical plane transverse to the opitcal axis of the projector and in the region of the picture aperture, said guide rail means being adapted for receiving a lower edge of a slide;
   (b) tension means coupled to said guide rail means for raising said guide rail means to its upper position;
   (c) second cam path means provided on said carriage; and
   (d) follower means connected to said guide rail means for engaging said second cam path, during the engagement thereof said second cam path lowers said guide rail means against the force of said tension means during the transporting of a slide from the magazine onto said guide rail means and then releases the guide rail means to its upper position thereby placing the slide in the optical axis of the projector.

8. A device as defined in claim 2 wherein said disk means is coaxially connected with said wheel means for shifting the magazine and said disk means is provided with a plurality of recesses about its circumference, said follower means of said connecting means engages respectively one of said recesses and rotates said disk through an angle corresponding to the displacement of the magazine in the direction of the optical axis, a distance which results in a new slide held in the magazine to be aligned with the picture aperture during the travel of said carriage from the projecting position back to the dispensing position.

9. A device as defined in claim 8 and further comprising a cam guide plate having said disk means mounted therein, said plate surrounding the circumference of said disk, and at least two openings being provided in said plate, a first opening for the entrance of said follower means of said connecting means, and a second opening for the exiting of said follower means during the travel of said carriage from the projecting position to the dispensing position, and during the travel of said carriage from the dispensing position to the projecting position said follower of said connecting means is resiliently guided along the outer surface of said guide plate.

10. A device as defined in claim 9 wherein the portion of said guide plate having said first opening is provided with an extension portion, and switch means mounted within said extension portion for directing said follower means of said connecting means onto a first or second path whereby said disk is rotated in a first or second direction respectively.

11. A device as defined in claim 1 further comprising means for moving said carriage, said means comprising:
   (a) a guide element rigidly connected to said carriage; and
   (b) engaging means mounted for eccentric rotation by a motor, said engaging means during one rotation engaging said guide element to cause said carriage to travel from the dispensing position to the projecting position and back to the dispensing position.

12. A device as defined in claim 11 wherein said guide element is provided with a guide groove extending transverse to the direction of movement of said carriage, said guide groove being approximately straight-lined and having a flanged portion with at least one opening for the entrance and the exit of said engaging means.

13. In a slide projector having a chassis, a projection system and a picture aperture in the optical axis of the projection system, a slide changing device for transporting a slide from a slide magazine which is parallel to the optical axis in the picture aperture and back into the magazine, and then stepwise displacing the magazine in a direction parallel to the optical axis, said slide changing device comprising, in combination:
   (a) an actuator carriage mounted on the chassis for reciprocatory movement in the direction of the optical axis between a dispensing position and a projecting position;
   (b) slide transport means provided in the region of the picture aperture for conveying a slide from the magazine to the picture aperture and back to the magazine;
   (c) two horizontal rods arranged parallel to each other in the region of the picture aperture and transverse to the optical axis of the projector, said rods having said slide transport means suspended therefrom for guiding said transport means along the extent thereof during the conveyance of a slide;
   (d) lever means coupled to said slide transport means for actuating said slide transport, said lever means comprising:
      (1) a vertical supporting pin provided laterally of the magazine about which said lever pivots;
      (2) a first lever arm mounted at one end of said pin, said first lever arm being provided with a curved slot for receiving a pin portion of said slide transport means, thereby coupling said lever to said slide transport means; and
      (3) a second lever arm mounted at the other end of said pin, said second lever arm being shorter than said first lever arm and having a follower portion connected thereto, said carriage being provided with a first cam path means for positively receiving said follower portion of said second lever arm, to cause the lever, during travel of said carriage from the dispensing position to the projecting position to actuate said slide transport means for conveying a slide from the magazine to the picture aperture, and during travel of said carriage back to the dispensing position, to actuate said slide transport means for conveying a slide in the picture aperture back to the magazine;
   (e) guide rail means mounted for pivotal movement in a vertical plane transverse to the optical axis of the projector and in the region of the picture aperture, said guide rail means being adapted to receive a lower edge of a slide;
   (f) tension means coupled to said guide rail means for raising said guide rail means to its upper position;

(g) second cam path means provided on said carriage;
(h) follower means connected to said guide rail means for engaging said second cam path, during the engagement thereof said second cam path lowers said guide rail means against the force of said tension means during the transporting of a slide from the magazine onto said guide rail means, and then releases the guide rail means to its upper position, thereby placing the slide in the optical axis of the projector;
(i) moving means mounted in said chassis for displacing the magazine in said direction parallel to the optical axis, said moving means comprising:
 (1) wheel menas having extensions thereon upwardly extending above the chassis for engagement with a rack means for displacing the magazine in a stepped manner, said wheel means being a pinwheel or a cogwheel; and
 (2) rotatable disk means coaxially connected with said wheel means for actuating the same, said disk means being provided with a plurality of recesses about its circumference;
(j) connecting means interposed between said carriage and said moving means for effecting a predetermined movement of said moving means, said connecting means having a follower portion at one end for engaging respectively one of said recesses of said disk and rotating said disk through an angle corresponding to the displacement of the magazine in said direction of the optical axis, a distance which results in a new slide held in the magazine to be aligned with the picture aperture, during the travel of said carriage from the projecting position back to the dispensing position;
(k) a cam guide plate having said disk means mounted thereon, said plate surrounding the circumference of said disk, and at least two openings being provided in said plate, a first opening for the entrance of said follower means of said connecting means and a second opening for the exiting of said follower means during the travel of said carriage from the projecting position to the dispensing position, and during the travel of said carriage from the dispensing position to the projecting position, said follower of said connecting means being resiliently guided along the outer surface of said guide plate, said guide plate being further provided with an extension portion at said first opening; and
(l) switch means mounted within said extension portion for directing said follower means of said connecting means onto a first or second path whereby said disk means is rotated in a first or second direction respectively for displacing the magazine in a first or second direction parallel to the optical axis of the projector.

14. A device as defined in claim 13 and further comprising a guide element rigidly connected to said carriage, said guide element having a guide groove extending transverse to the direction of movement of said carriage, said guide groove being approximately straight-lined and having a flanged portion with at least one opening therein, eccentrically mounted rotatable engaging means entering and exiting said guide groove through said one opening and during one rotation engaging said guide groove to cause said carriage to travel from the dispensing position to the projecting position and back to the dispensing position, and a motor for rotating said engaging means.

15. A device as defined in claim 13 and further comprising a manually operable handle means rigidly connected to said carriage and projecting upwardly therefrom through said projector chassis for allowing manual movement of said carriage.

References Cited

UNITED STATES PATENTS

| | | | |
|---|---|---|---|
| 2,671,378 | 3/1954 | Burla | 40—79 X |
| 2,984,151 | 5/1961 | Halahan et al. | 40—78 X |
| 3,121,368 | 2/1964 | Hall | 40—79 X |
| 3,146,667 | 9/1964 | Mulch | 40—79 X |

R. CARTER, *Assistant Examiner.*

EUGENE R. CAPOZIO, *Primary Examiner.*